United States Patent Office 2,736,393
Patented Feb. 28, 1956

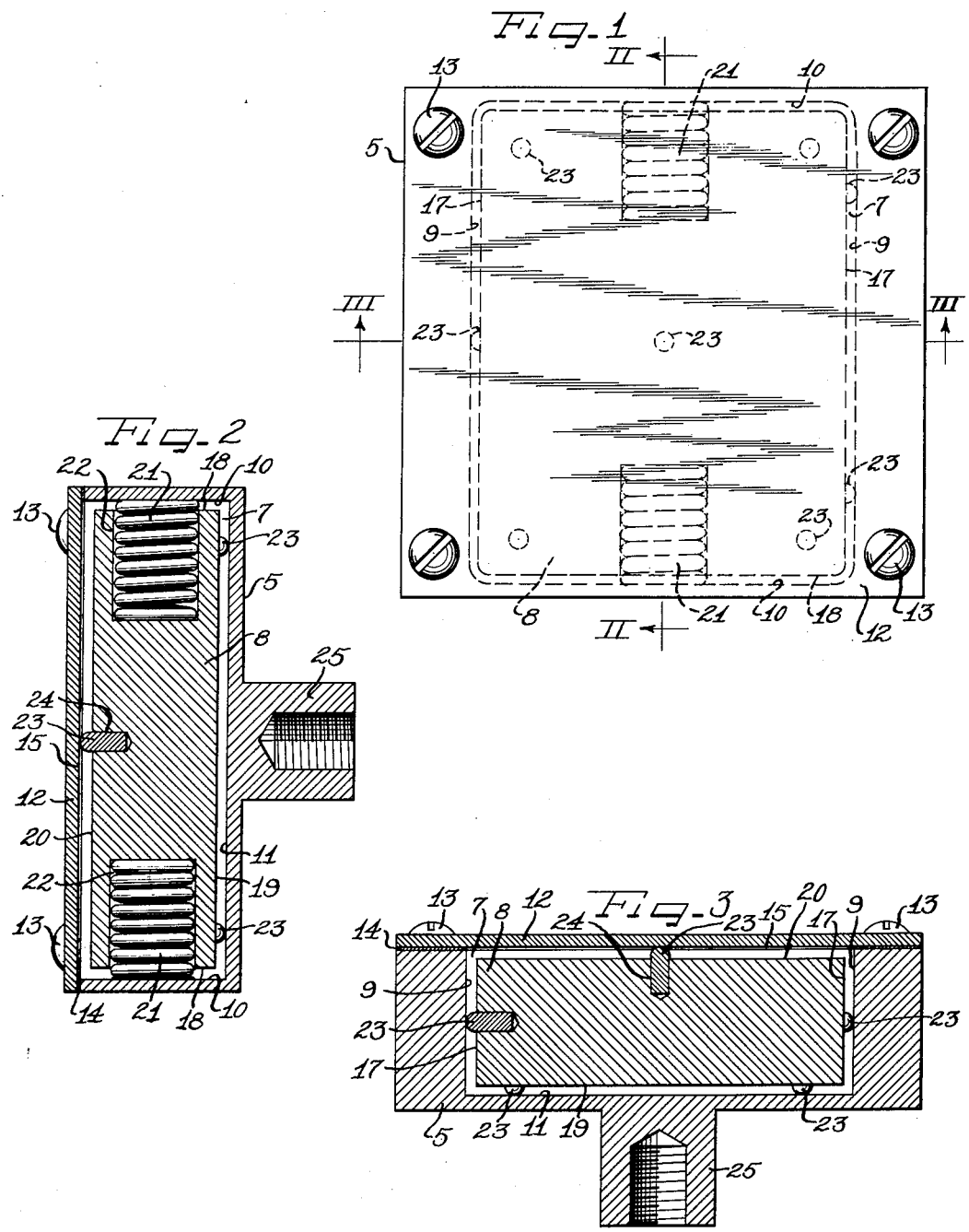
Inventor
Bernard E. O'Connor

2,736,393

TUNED VIBRATION DAMPER

Bernard E. O'Connor, Buffalo, N. Y., assignor to Houdaille-Hershey Corporation, Detroit, Mich., a corporation of Michigan Application June 2, 1950, Serial No. 165,724

7 Claims. (Cl. 188—1)

The present invention relates to improvements in vibration dampers and more particularly concerns an improved damper which is adapted to be tuned to reduce the amplitude of a linear vibration of specific frequency.

An important object of the present invention is to provide a vibration damper which is adapted to be made in various sizes for different requirements but is especially suitable for small unit requirements.

Another object of the invention is to provide a novel vibration damper which is adapted to be tuned to a desired frequency by a pre-loaded spring structure and which in addition covers a range bracketing the tuned frequency by viscous fluid damping.

A further object of the invention is to provide an improved viscous fluid vibration damper having novel means for maintaining predetermined spacing between parallel relatively movable working surfaces.

Yet another object of the invention is to provide a novel vibration damper especially adapted for damping linear vibrations.

Still another object of the invention is to provide a simple, low cost linear vibration damper of general purpose utility.

Other objects, features and advantages of the present invention will be readily apparent from the following detailed description of a preferred embodiment thereof taken in conjunction with the accompanying drawing, in which:

Figure 1 is a front elevational view of a vibration damper embodying the features of the invention;

Figure 2 is a vertical sectional detail view taken substantially on the line II—II of Figure 1; and Figure 3 is a horizontal sectional detail view taken substantially on the line III—III of Figure 1.

A linear vibration damper according to the present invention comprises a casing 5 defining a chamber 7 within which is housed in inertia mass 8. The construction and arrangement is such that when the casing 5 is mounted fixedly upon a mass of any kind subject to linear vibrations to be damped the housing will vibrate or tend to vibrate with the mass to which it is attached but the inertia mass 8 will tend to remain free from the vibrations. It is this phenomenon which is relied upon to dampen the vibrations.

In a simple and expedient form, the casing or housing 5 may comprise a block of suitable material hollowed out to provide a rectangular cavity for the chamber 7, with the chamber cavity opening from one broad face of the block. By preference the chamber 7 is elongated in one dimension, having spaced parallel opposed longitudinal sides 9 and opposed end walls 10 with a flat rectangularly related inner wall 11 completing the cavity. Closure for the chamber cavity is provided by a closure plate 12 opposing the flat face surface of the casing block about the mouth of the chamber and secured thereto as by means of screws 13. A fluid tight relationship between the closure plate or cover 12 and the opposing margins of the casing block or body is provided by an appropriate gasket 14. There is thus provided a fully rectangular chamber with an inner flat wall 15 of the cover plate 12 opposing in parallel relation the inner flat surface 11 of the chamber cavity. Even though, as indicated in Fig. 1, certain corners within the device may be rounded off or filleted for manufacturing convenience, this does not detract from the essential rectangularity in the relationship of the various working surfaces within the device.

The inertia member 8 comprises a solid rectangular block of material of suitable specific gravity to provide the desired weight and having all of the surfaces thereof rectangularly related and complementary to respective opposing surfaces within the housing chamber 7. To this end, the inertia mass 8 has oppositely facing, parallel longitudinal side surfaces 17 opposing the chamber side wall surfaces 9. Opposite parallel end surfaces 18 on the inertia mass are disposed in respective predetermined spaced opposition to the end surfaces 10 of the chamber cavity. A broad surface 19 opposes the chamber inner wall 11 in parallel relation while an opposite parallel broad surface 20 opposes the cover wall 15. A spaced relationship is provided for between all of the opposing wall surfaces of the inertia mass 8 and of the housing. Thereby the inertia mass and the housing can move relatively.

Since a function of the device is to reduce the amplitude of a linear vibration of specific frequency, means are provided for tuning the damper to such frequency. To this end, the opposite ends of the inertia mass 8 are equally and oppositely resiliently biased by means such as pre-loaded respective springs 21 which, in a general sense, provide tuned resilient couplings between the inertia mass and the casing 5. A linear coaxial relation of the springs 21 is maintained by seating the same in sockets 22 respectively provided in the opposite ends of the inertia mass and with the springs bearing at their inner ends against the inner ends of the sockets while the outer ends of the springs bear under compression against the opposing end surfaces 10 within the housing chamber. Through this arrangement, the amplitude of a linear vibration of known frequency can be effectively reduced by predetermined pre-loading of the coiled compression springs 21. A predetermined gap relationship is maintained by the springs between the inertia mass 8 and the opposing end walls 10 of the housing chamber in the at rest condition of the damper. In the presence of linear vibrations on the axis of the springs 21 transmitted to the housing 5 from the associated vibrating mass to be damped, the inertia mass 8, of course, tends to maintain its position of equilibrium but due to the spring coupling is forced to vibrate within the housing. Therefore, at the tuned frequency or vibration of the inertia mass 8 a large part of the energy of vibration in the associated mass to be damped is absorbed by the damping action between the casing 5 and the inertia mass and the amplitude of vibration of the main mass is substantially reduced.

The vibration damping efficiency of the damper unit is extended over a substantial range to both sides of the tuned frequency by also incorporating viscous damping fluid in the unit. To this end, the clearance or gap relationship between the several parallel relatively moving opposing surfaces of the casing and the inertia mass is uniformly predetermined to a very narrow dimension and a fill of viscous fluid such as a silicone of desirable viscosity is sealed within the chamber 7 to occupy substantially all of the remainder of the chamber volume. As a result, the damping action is substantially modified and improved.

In the first place, resistance of the viscous fluid to displacement from between the opposite ends of the inertia mass 8 during relative rectilinear vibratory movements between the casing 5 and the inertia mass produces a damping action.

Secondly, and in conjunction with the end displacement of the viscous fluid, a substantial volume of the viscous fluid which occupies the spring socket cavities 22 in the ends of the inertia mass 8 is subject to displacement and replenishment as a result of the alternate compression and contraction of the pre-loaded springs 21 and due to the greatly multiplied surfaces over and through and past which the viscous fluid must move on the socket walls and the spring coils, develops significant resistance having vibration damping value. This action may be likened to a pumping action and with the coils of the springs 21 acting substantially like restrictor or choke valves in those relative movements of the casing 5 and the inertia mass 8 which cause compression of the respective springs. During respective expansion of the springs, there is nevertheless the surface friction resistance to replenishment flow or movement of the viscous fluid.

Thirdly, there is the viscous fluid damping effect which is a result of the resistance to relative movement of the opposed parallel moving working surfaces of the casing and the inertia mass in the presence of the viscous fluid coupling between such surfaces. The vibration damping action of this feature alone would be quite significant, but added to the displacement and choke valve resistances already referred to, affords an exceptionally effective damping action.

For some purposes the viscous fluid gap relationship between certain or all of the relatively parallel moving surfaces of the casing and the inertia mass may be of such closeness, greater than a mere lubricating film spacing, but less than a drag or non-linear velocity gradient relationship, to afford a linear velocity gradient or shear film relationship. That is, the spacing between the opposing surfaces is so related to the viscosity of the fluid that upon any tendency toward rapid relative parallel movement of the opposing surfaces the viscous fluid resists such relative parallel movement with shearing effect. For other applications of the damper the high resistance to relative linear movement of the housing and the inertia mass afforded by the shear films of viscous fluid may not be necessary or desirable by reason of desiring a softer or less resistant damping action and in such cases varying degrees of non-linear velocity gradient relationship between the opposing relatively parallel moving surfaces may be effected.

Not only the viscous fluid damping efficiency but also the spring loaded tuned damping efficiency of the damper is improved and maintained substantially uniform by the provision of means for maintaining a uniform spacing as predetermined between the several opposing relative parallel moving surfaces of the casing 5 and the inertia mass 8. Herein, such means comprise node-like projections 23 from the respective parallel movable surfaces of the inertia mass 8. Economically and effectively the projections 23 may be in the form of pegs having semi-spherical or rounded outer ends and cylindrical shank portions fitted into appropriate respective sockets 24 in the inertia mass 8. The rounded tips of the projection pegs assure minimum frictional contact with the opposing surfaces of the casing. The viscous fluid within the chamber 7 provides lubricant which also minimizes frictional resistance and wear and heating in operation.

In a minimum number distribution pattern of the spacer pegs 23, four of the pegs are disposed to project from the inertia mass surface 19 adjacent to the corners of the inertia mass while but a single spacer peg 23 projects from the opposite face 20 of the inertia mass in centered relation. A pair of the spacer pegs 23 is disposed to project from one of the side faces 17 of the inertia mass adjacent respectively opposite ends of such surface, while a single centered spacer peg 23 projects from the opposite or remaining side surface of the inertia mass. This maintains the inertia mass 8 uniformly spaced with respect to the surfaces thereof which are adapted to move relatively rectilinearly in parallel relation to opposing surfaces of the housing 5 and effectively counteractant and preventive of torque displacement of the inertia mass 8 within the chamber 7. Thereby the uniformity and effectiveness of the laminar viscous fluid damping is assured, and at the same time the efficient axial functioning of the tuning springs 21 is preserved.

By use of the socketed spacer pegs 23, an infinite variety of predetermined surface spacing relationships can be provided for by appropriate selection of the length of pegs or the depth of sockets, or both. Therefore this socketed peg arrangement is extremely versatile.

Suitable means are provided for attaching the damper unit to the mass to be damped. An appropriate expedient comprises the provision of a hollow internally threaded boss 25 projecting from one external surface of the casing 5, in the present instance being shown as projecting centrally from the back surface of the housing. It will be appreciated, however, that the attachment boss or stem 25 may be provided at any suitable place on the casing, or other desirable expedient may be employed for attaching the unit.

From the foregoing it will be apparent that the vibration damper unit of the present invention is readily adaptable for damping linear vibrations in a great many practical applications. The damper may be made in any size preferred or required for meeting various service conditions. In any given size, a substantial range of tuned or intermediate or additional vibration modes can be accommodated. In addition, the damper has the advantage of simplicity and low manufacturing cost attributes.

It will be understood that modifications and variations may be effected without departing from the scope of the novel concepts of the present invention.

I claim as my invention:

1. A linear vibration damper comprising in combination, a housing defining a rectangular chamber, an inertia mass of complementary rectangular and smaller dimensions with respect to the dimensions within the chamber housed within the chamber and rectilinearly movable therein, tuned spring means between opposite ends of the inertia mass and opposite end walls defining the chamber, and viscous damping fluid in the chamber and operative between all opposing faces of the inertia mass and surfaces defining the chamber for supplementing the tuned spring means in damping linear vibrations outside of the frequency for which the spring means are tuned, the opposing longitudinal surfaces of the inertia mass and of the walls defining said chamber being in uniform closely spaced relation providing very narrow gaps therebetween through which displacement of the damping fluid occurs under relatively high resistance.

2. In combination in a linear vibration damper, means defining a six-sided chamber having opposing end walls, a six-sided inertia mass having all sides and opposite ends in relatively closely spaced relation to the side and end walls of said chamber and adapted for linear movement toward and away from said respective end walls, sockets of substantial depth in said ends of the inertia mass, tuned coil springs mounted in said sockets and projecting at their ends beyond the sockets through the respective gaps between the ends of the inertia mass and said end walls and bearing under compression against said end walls, and viscous damping fluid in said chamber and filling said sockets and said gaps, said gaps being operatively small enough relative to the viscosity of the damping fluid to result in laminar resistance of the fluid to displacement through said gaps, thereby resisting pumping action upon relative linear vibrational movements of the inertia mass and said means providing the chamber.

3. In combination in a linear vibration damper, means defining a chamber having opposing end walls, an inertia mass having opposite ends in relatively closely spaced relation to said end walls and adapted for linear movement toward and away from said respective end walls, sockets of substantial depth in said ends of the inertia mass, tuned coil springs mounted in said sockets and projecting at their ends beyond the sockets through the respective gaps between the ends of the inertia mass and said end walls and bearing under compression against said end walls, and viscous damping fluid in said chamber and filling said sockets and said gaps and resisting pumping action upon relative linear vibrational movements of the inertia mass and said means providing the chamber, the coils of said springs being of substantially the same outside diameter as the inside diameter of the sockets so that substantially all of the fluid within the sockets must pass through the coils of the springs on displacement of fluid relative to said sockets, said spring coils being normally sufficiently closely spaced to act upon compression of the springs during said linear relative movement as choke valves to resist displacement of the hydraulic fluid from the respective sockets.

4. In combination in a linear vibration damper, means defining a chamber having opposing end walls, an inertia mass having opposite ends in relatively closely spaced relation to said end walls and adapted for linear movement toward and away from said respective end walls, sockets of substantial depth in said ends of the inertia mass, tuned coil springs mounted in said sockets and projecting at their ends beyond the sockets through the respective gaps between the ends of the inertia mass and said end walls and bearing under compression against said end walls, and viscous damping fluid in said chamber and filling said sockets and said gaps and resisting pumping action upon relative linear vibrational movements of the inertia mass and said means providing the chamber, the coils of said springs being normally sufficiently closely spaced to act upon compression of the spring during said linear relative movement as choke valves to resist displacement of the hydraulic fluid from the respective sockets, said inertia mass and the chamber having opposed parallel closely spaced relatively rectilinearly movable surfaces in shear film spacing having regard to the viscosity of the fluid and between which the viscous damping fluid acts in shear in vibration damping relation by resisting relative rectilinear vibrational movements.

5. In combination in a linear vibration damper, a casing member having a chamber therein with opposing end walls, an inertia member in said chamber and having end walls closely spaced relative to said chamber end walls, relatively deep sockets in said inertia member end walls having cylindrical socket walls, coiled compression springs seated in said sockets and projecting beyond the inertia member end walls into compression engagement with the opposing chamber end walls, and viscous damping fluid filling said chamber in all of the spaces between said inertia member and the walls of the chamber completely, including said sockets and the spaces within the springs, the springs having sufficiently closely spaced coils and the diameter of the springs sufficiently closely approximating the diameter of the cylindrical walls of the sockets so that the springs provide chokes upon displacement of viscous fluid with respect to said sockets in the rectilinear movements of the inertia member relative to the casing member.

6. A linear vibration damper comprising in combination, a housing defining a rectangular chamber, an inertia mass of complementary rectangular and smaller dimensions with respect to the dimensions within the chamber housed within the chamber and rectilinearly movable therein, tuned spring means between opposite ends of the inertia mass and opposite end walls defining the chamber, viscous damping fluid in the chamber and operative between all opposing faces of the inertia mass and surfaces defining the chamber for supplementing the tuned spring means in damping linear vibrations outside of the frequency for which the spring means are tuned, the opposing longitudinal surfaces of the inertia mass and of the walls defining said chamber being in uniform closely spaced relation providing very narrow gaps therebetween through which displacement of the damping fluid occurs under relatively high resistance, and rigid spaced substantially point contact spacers carried by the longitudinal surfaces of the inertia mass and opposing the longitudinal wall surfaces of the chamber for positively maintaining said uniform closely spaced relation.

7. A linear vibration damper comprising in combination, a housing defining a rectangular chamber, an inertia mass of complementary rectangular and smaller dimensions with respect to the dimensions within the chamber housed within the chamber and rectilinearly movable therein, tuned spring means between opposite ends of the inertia mass and opposite end walls defining the chamber, viscous damping fluid in the chamber and operative between all opposing faces of the inertia mass and surfaces defining the chamber for supplementing the tuned spring means in damping linear vibrations outside of the frequency for which the spring means are tuned, the opposing longitudinal surfaces of the inertia mass and of the walls defining said chamber being in uniform closely spaced relation providing very narrow gaps therebetween through which displacement of the damping fluid occurs under relatively high resistance, and rigid spaced substantially point contact spacers carried by the longitudinal surfaces of the inertia mass and opposing the longitudinal wall surfaces of the chamber for positively maintaining said uniform closely spaced relation, said spacers comprising pegs with rounded outer tips and the inertia mass having sockets therein within which the pegs are fitted.

References Cited in the file of this patent

UNITED STATES PATENTS

| | | |
|---|---|---|
| 1,744,332 | Paton et al. | Jan. 21, 1930 |
| 1,783,348 | Taylor | Dec. 2, 1930 |
| 1,995,620 | Monroe | Mar. 26, 1935 |
| 2,016,207 | Lindenberg | Oct. 1, 1935 |
| 2,514,140 | O'Connor | July 4, 1950 |
| 2,584,222 | O'Connor | Feb. 5, 1952 |
| 2,618,492 | Singer | Nov. 18, 1952 |

FOREIGN PATENTS

| | | |
|---|---|---|
| 362,004 | Great Britain | Dec. 3, 1931 |
| 468,365 | Great Britain | June 30, 1937 |

OTHER REFERENCES

"Machine Design," Designing Vibration Absorbers, Nov. 1949, pages 142–145. (Copy in Division 65.)